United States Patent
Fujimoto et al.

(10) Patent No.: US 12,247,740 B2
(45) Date of Patent: Mar. 11, 2025

(54) FUEL INJECTOR, COMBUSTOR INCLUDING THE FUEL INJECTOR, AND GAS TURBINE INCLUDING THE COMBUSTOR

(71) Applicant: MITSUBISHI HEAVY INDUSTRIES, LTD., Tokyo (JP)

(72) Inventors: Kiyoshi Fujimoto, Yokohama (JP); Shinichi Fukuba, Tokyo (JP); Mitsuhiro Nakao, Tokyo (JP); Yoshikazu Matsumura, Yokohama (JP); Kota Yoshino, Yokohama (JP); Satoshi Takiguchi, Tokyo (JP); Sosuke Nakamura, Yokohama (JP); Shinji Akamatsu, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 3 days.

(21) Appl. No.: 17/928,771

(22) PCT Filed: Jun. 21, 2021

(86) PCT No.: PCT/JP2021/023368
§ 371 (c)(1),
(2) Date: Nov. 30, 2022

(87) PCT Pub. No.: WO2021/261431
PCT Pub. Date: Dec. 30, 2021

(65) Prior Publication Data
US 2023/0228421 A1    Jul. 20, 2023

(30) Foreign Application Priority Data
Jun. 26, 2020 (JP) .................................. 2020-110413

(51) Int. Cl.
*F23R 3/00* (2006.01)
*F02C 7/22* (2006.01)
(Continued)

(52) U.S. Cl.
CPC ................ *F23R 3/286* (2013.01); *F02C 7/22* (2013.01); *F23R 3/16* (2013.01); *F23R 3/32* (2013.01);
(Continued)

(58) Field of Classification Search
None
See application file for complete search history.

(56) References Cited

U.S. PATENT DOCUMENTS 4,198,815 A * 4/1980 Bobo .................... F23R 3/14
60/737
5,778,676 A * 7/1998 Joshi .................... F23D 17/002
60/737
(Continued)

FOREIGN PATENT DOCUMENTS

CN  102588973  7/2012
JP  2001-280641 10/2001
(Continued)

OTHER PUBLICATIONS

International Search Report issued Aug. 24, 2021 in corresponding International (PCT) Patent Application No. PCT/JP2021/023368, with English language translation.
(Continued)

*Primary Examiner* — Edwin Kang
(74) *Attorney, Agent, or Firm* — Wenderoth, Lind & Ponack, L.L.P.

(57) ABSTRACT

A fuel injector has a body extending in an axial direction. The body includes: an axial passage formed so as to extend in the axial direction; a radial passage formed so as to
(Continued)

communicate at one end with the axial passage and to open at another end to an outer surface of the body; and an internal passage including a first opening and a second opening open to the outer surface, and formed so as to extend inside the body from the first opening to the second opening. The first opening and the second opening are located opposite to each other across a third opening, through which the radial passage opens to the outer surface, in a circumferential direction centered on an axis of the body.

12 Claims, 12 Drawing Sheets

(51) Int. Cl.
  *F23R 3/16* (2006.01)
  *F23R 3/28* (2006.01)
  *F23R 3/32* (2006.01)
(52) U.S. Cl.
  CPC ...... *F05D 2220/32* (2013.01); *F05D 2240/35* (2013.01)

(56) References Cited

U.S. PATENT DOCUMENTS

| | | |
|---|---|---|
| 2004/0177615 A1 | 9/2004 | Martling |
| 2006/0016193 A1* | 1/2006 | Roche ................. F02K 3/11 60/761 |
| 2007/0207425 A1 | 9/2007 | Brautsch et al. |
| 2008/0078183 A1 | 4/2008 | Ziminsky et al. |
| 2009/0277177 A1 | 11/2009 | Hessler |
| 2012/0137703 A1* | 6/2012 | Desai ................. F23R 3/28 60/782 |
| 2012/0151927 A1 | 6/2012 | Desai et al. |
| 2019/0107053 A1 | 4/2019 | Miyamoto et al. |

FOREIGN PATENT DOCUMENTS

| | | |
|---|---|---|
| JP | 2006-144759 | 6/2006 |
| JP | 2008-89298 | 4/2008 |
| JP | 2009-270816 | 11/2009 |
| JP | 2012-132673 | 7/2012 |
| JP | 2017-180267 | 10/2017 |
| TW | I366648 | 6/2012 |

OTHER PUBLICATIONS

International Preliminary Report on Patentability issued Dec. 13, 2022 in corresponding International (PCT) Patent Application No. PCT/JP2021/023368, with English language translation.
Office Action issued Jul. 18, 2023 in corresponding Japanese Patent Application No. 2022-531966, with English translation, 9 pages.
Office Action issued Oct. 17, 2023 in corresponding Japanese Patent Application No. 2022-531966, with Machine Translation, 10 pages.
Office Action issued Jun. 17, 2024 in corresponding Korean Patent Application No. 10-2022-7043997, with Machine Translation, 11 pages.

* cited by examiner

FUEL INJECTOR, COMBUSTOR INCLUDING THE FUEL INJECTOR, AND GAS TURBINE INCLUDING THE COMBUSTOR

TECHNICAL FIELD

The present disclosure relates to a fuel injector, a combustor including the fuel injector, and a gas turbine including the combustor.

This application claims the priority of Japanese Patent Application No. 2020-110413 filed on Jun. 26, 2020, the content of which is incorporated herein by reference.

BACKGROUND

A gas turbine disclosed in Patent Document 1 is provided with a fuel injector (peg) having a double pipe structure with an inner pipe through which fuel flows and an outer pipe through which air flows. The fuel injector extends in a direction intersecting an air flow direction, which may form stagnation in a downstream region of the fuel injector in the air flow direction. If air containing the fuel injected from the fuel injector stagnates in such stagnation, reliability of the combustor is reduced.

To cope therewith, in the fuel injector provided in the gas turbine of Patent Document 1, the outer pipe through which air flows has an opening at a position corresponding to a region where such stagnation is formed and air is injected from the opening, thereby sweeping away the stagnant air and fuel. Thus, it is possible to suppress formation of stagnation.

CITATION LIST

Patent Literature

Patent Document 1: JP2017-180267A

SUMMARY

Technical Problem

However, in the gas turbine of Patent Document 1, a part of air compressed by a compressor needs to flow through the outer pipe of the fuel injector. In order to achieve this, a line or the like for supplying the part of the air to the outer pipe of the fuel injector is required, causing a problem that the configuration of the combustor becomes complicated.

In view of the above, an object of at least one embodiment of the present disclosure is to provide a fuel injector, a combustor including the fuel injector, and a gas turbine including the combustor, which are capable of improving reliability of the combustor.

Solution to Problem

In order to achieve the above object, a fuel injector according to the present disclosure is a fuel injector that has a body extending in an axial direction. The body includes: an axial passage formed so as to extend in the axial direction; a radial passage formed so as to communicate at one end with the axial passage and to open at another end to an outer surface of the body; and an internal passage including a first opening and a second opening open to the outer surface, and formed so as to extend inside the body from the first opening to the second opening. The first opening and the second opening are located opposite to each other across a third opening, through which the radial passage opens to the outer surface, in a circumferential direction centered on an axis of the body.

Advantageous Effects

According to a fuel injector of the present disclosure, it is possible to reduce the possibility that stagnation of air and fuel flow is formed in a downstream region of the fuel injector, making it possible to improve reliability of a combustor.

DETAILED DESCRIPTION

Hereinafter, a fuel injector according to the embodiments of the present disclosure will be described with reference to the drawings. The embodiments each indicate one aspect of the present disclosure, do not intend to limit the disclosure, and can optionally be modified within a range of a technical idea of the present disclosure.

<Configuration of Gas Turbine and Combustor According to Embodiment of Present Disclosure>

Figure 1:
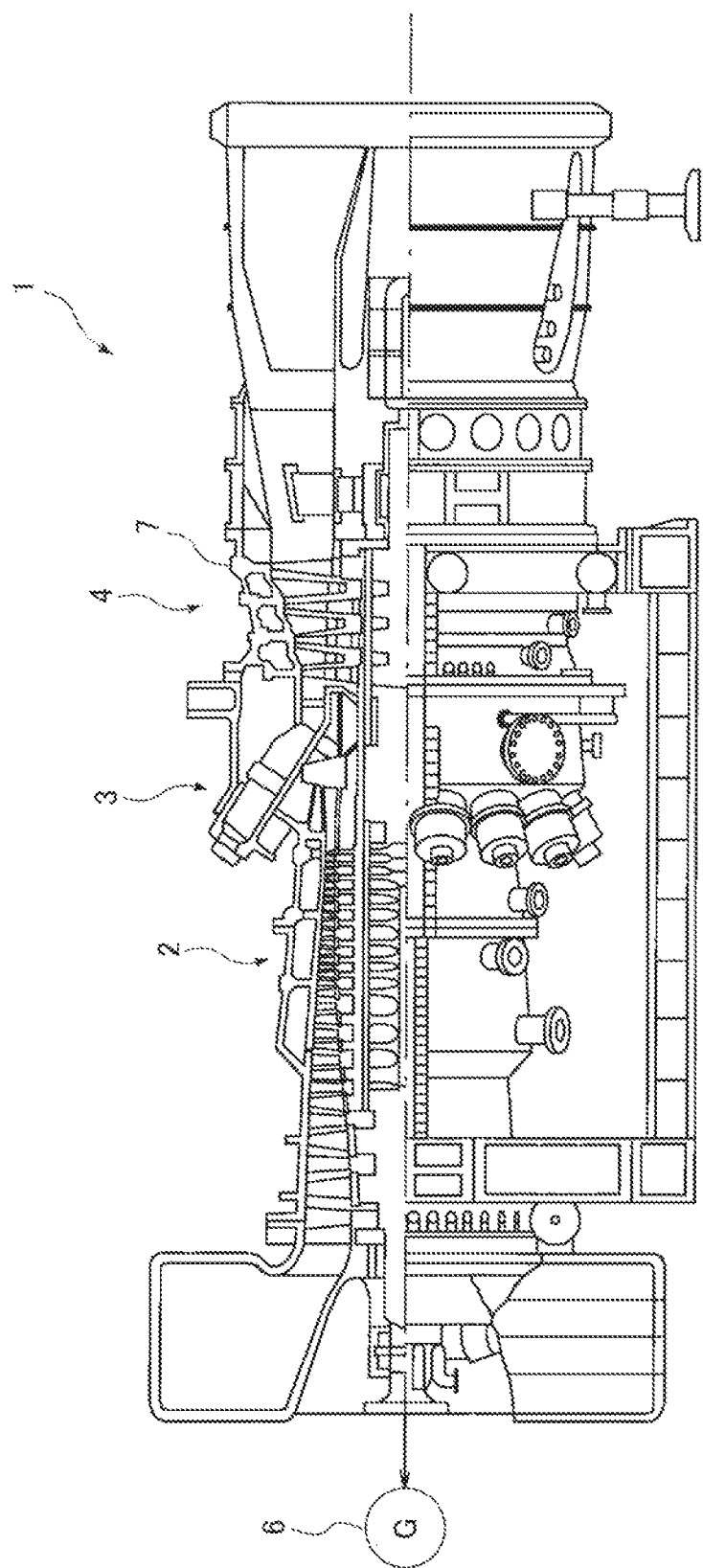
FIG. 1 is a schematic configuration view of a gas turbine according to an embodiment of the present disclosure.

As shown in FIG. 1, a gas turbine 1 according to an embodiment of the present disclosure includes a compressor 2, a plurality of combustors 3 (only one combustor 3 is illustrated in FIG. 1), and a turbine 4. The compressor 2 is configured to suck in and compress atmosphere which is external air, and to supply the compressed air to the combustor 3. The combustor 3 is configured to combust fuel supplied from outside with the air compressed by the compressor 2, thereby producing a combustion gas. The turbine 4 is configured to generate a rotational driving force in response to supply of the combustion gas produced by the combustor 3, and to output the generated rotational driving force to the compressor 2 and an external device such as a generator 6.

Figure 2:
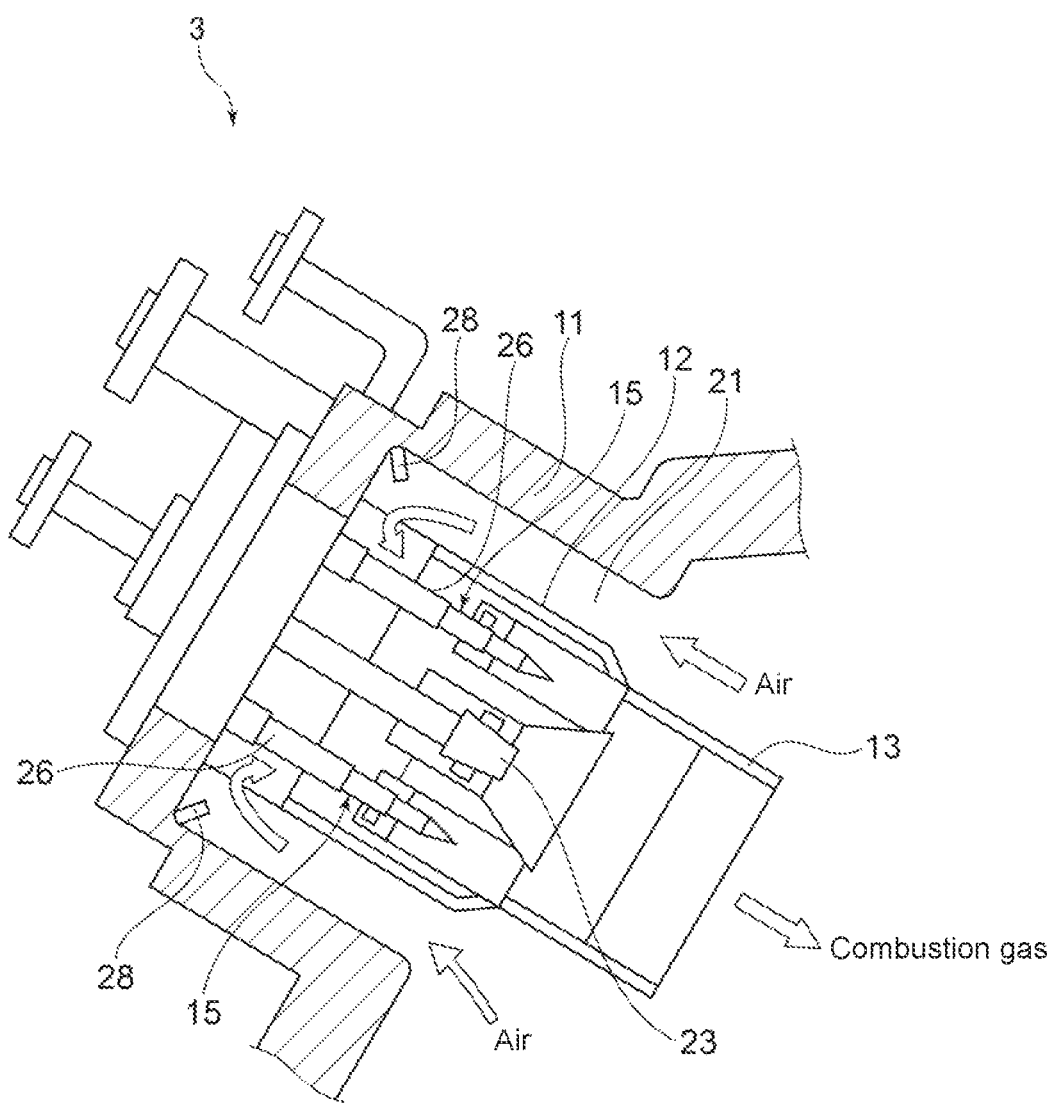
FIG. 2 is a cross-sectional view of a part of a combustor according to an embodiment of the present disclosure.

As shown in FIG. 2, the combustor 3 includes an outer shell 11 and inside the outer shell 11, a combustion liner 12 is disposed with predetermined spacing in the radial direction centered on the axis of the outer shell 11. A transition piece 13 is connected to a tip end portion of the combustion liner 12. Between the outer shell 11 and the combustion liner 12, a ring-shaped passage 21 is formed through which the air compressed by the compressor 2 (see FIG. 1) flows.

Inside the combustion liner 12, arranged are a pilot combustion burner 14 and a plurality of main combustion burners 15 disposed so as to surround the pilot combustion burner 14. The pilot combustion burner 14 includes a pilot nozzle 23, and each of the main combustion burners 15 includes a main nozzle 26. In the passage 21, a plurality of pegs 28 each of which is a fuel injector (only two pegs 28 are illustrated in FIG. 2) are disposed at predetermined intervals in the circumferential direction centered on the axis of the outer shell 11 (that is, the circumferential direction centered on the axis of the combustion liner 12). Each peg 28 is disposed such that its base end portion is fixed to the outer shell 11 and its tip end portion extends toward the combustion liner 12.

<Configuration of Combustion Injector According to Embodiment of Present Disclosure>

Figure 3:
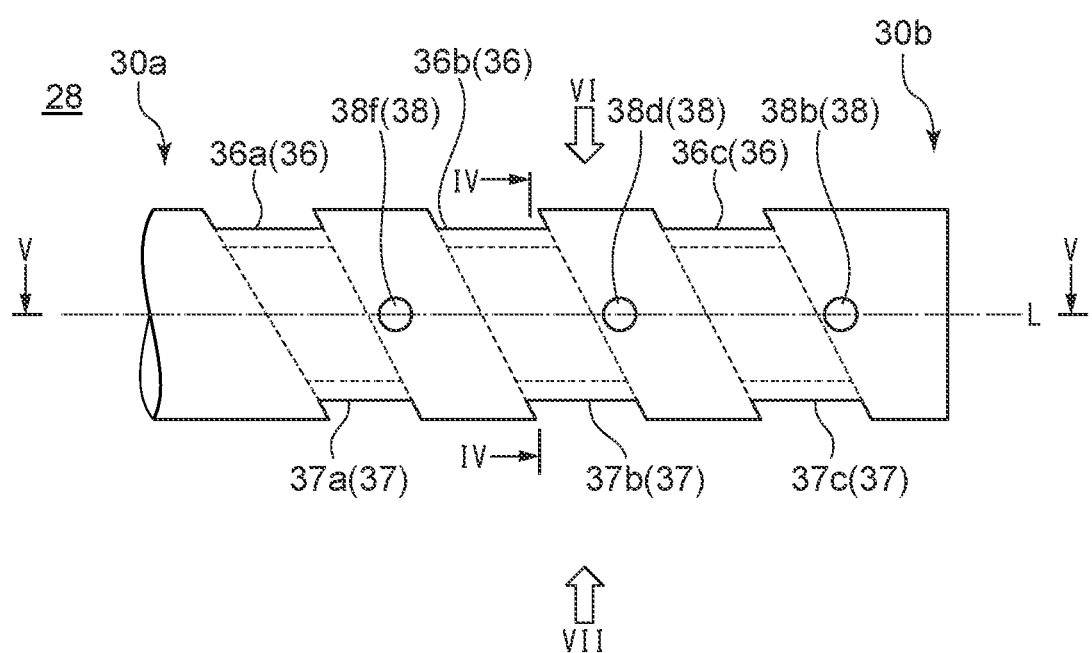
FIG. 3 is a side view of a combustion injector according to an embodiment of the present disclosure.
Figure 4:
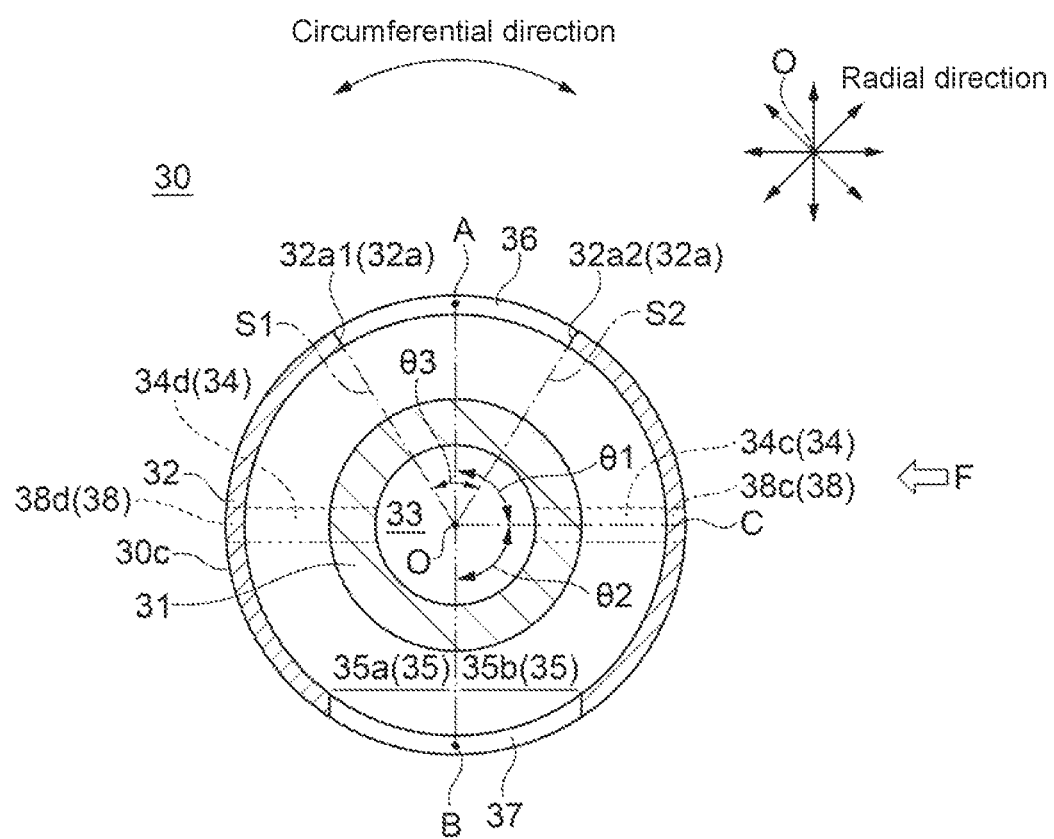
FIG. 4 is a cross-sectional view taken along line IV-IV in FIG. 3.

As shown in FIG. 3, the peg 28 includes a body 30 extending from a base end portion 30a to a tip end portion 30b. As shown in FIG. 4, the body 30 has a double pipe structure composed of an inner pipe 31 and an outer pipe 32, and the body 30 is formed with an axial passage 33 formed so as to extend in the axial direction, and an internal passage 35 including a first opening 36 and a second opening 37 open to an outer surface 30c of the body 30 and formed so as to extend inside the body 30 from the first opening 36 to the second opening 37. The internal passage 35 is configured to extend so as to surround the axial passage 33 on the inner side in the circumferential direction centered on an axis L of the body 30 (hereinafter, simply referred to as the "circumferential direction"), and includes two branch passage portions 35a, 35b extending from the first opening 36 toward the second opening 37 in opposite directions in the circumferential direction. The axial passage 33 and the internal passage 35 do not communicate with each other.

Figure 5:
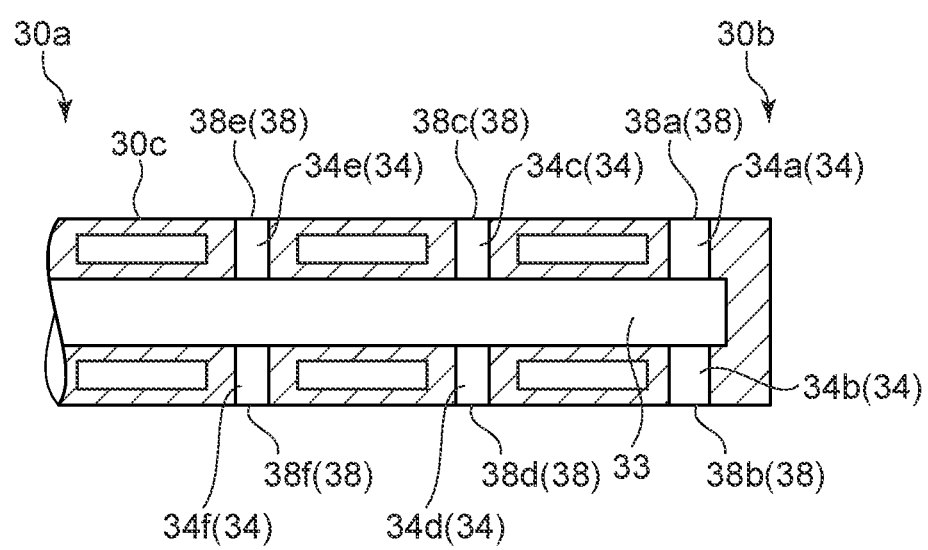
FIG. 5 is a cross-sectional view taken along line V-V in FIG. 3.

As shown in FIG. 5, the body 30 is further formed with a radial passage 34 formed so as to communicate at one end with the axial passage 33 and to open at another end to the outer surface 30c of the body 30. The radial passage 34 and the internal passage 35 (see FIG. 4) do not communicate with each other. In the outer surface 30c, a third opening 38 is formed as an opening of the radial passage 34. In FIG. 5, the radial passage 34 includes six radial passages 34a, 34b, 34c, 34d, 34e, 34f. However, the number of radial passages is not limited to six but may be any number. Further, the position of each radial passage 34 is not limited, either. In FIG. 5, two radial passages 34 (for example, the radial passages 34a and 34b) are formed at the same position in the axial direction, but only one radial passage 34 may be formed at any position in the axial direction. For example, the two radial passages 34a and 34b are disposed in the vicinity of the tip end portion 30b and at the same position in the axial direction (however, these two are open at different positions in the circumferential direction), and the other four radial passages 34c to 34f may respectively be disposed at different positions in the axial direction closer to the base end portion 30a side than the radial passages 34a and 34b.

Thus, positions of third openings 38a, 38b, 38c, 38d, 38e, 38f of the radial passages 34a, 34b, 34c, 34d, 34e, 34f on the outer surface 30c are respectively determined according to positions of the radial passages 34a, 34b, 34c, 34d, 34e, 34f. The respective positions of the radial passages 34a, 34b, 34c, 34d, 34e, 34f are preferably determined such that the third openings 38a, 38b, 38c, 38d, 38e, 38f are located within a range where the second opening 37 (see FIG. 4) exists in the axial direction.

As shown in FIG. 4, even when the body 30 is seen to face any third opening 38, such as the third opening 38c (in the direction of an arrow F), the first openings 36 and the second opening 37 are located opposite to each other across the third opening 38c in the circumferential direction. That is, the third opening 38c is located between the first opening 36 and the second opening 37 in the circumferential direction. An angle AOC (hereinafter, referred to as an angle $\theta1$) and an angle BOC (hereinafter, referred to as an angle $\theta2$) are each not less than 45° and not greater than 135°, preferably not less than 60° and not greater than 120°, more preferably not less than 80° and not greater than 100°, or most preferably 90°, where A, B, and C are respective center positions of the first opening 36, the second opening 37, and the third opening 38c in the circumferential direction, and O is an axial center of the body 30 on the axis L. The configuration shown in FIG. 4 depicts the configuration in the most preferable case of $\theta1=\theta2=90°$.

It is preferable to satisfy $45°\leq\theta3\leq90°$, where $32a1$, $32a2$ are respectively opening surfaces, of an opening surface $32a$ of the outer pipe 32 defining the first opening 36, facing each other in the circumferential direction, and $\theta3$ is an angle formed by respective extension surfaces S1 and S2 of the opening surfaces $32a1$, and $32a2$. As will be described later, the part of the air compressed by the compressor 2 (see FIG. 1) flows into the internal passage 35 via the first opening 36. However, if $\theta3$ is less than 45°, in order to allow air to flow in as much as possible, an opening width in the circumferential direction has to be widened, which is limited due to the thickness of the body 30. On the other hand, even if $\theta3$ is greater than 90°, the effect of causing air to flow in as much as possible cannot be expected to improve compared to the case of $\theta3=90°$, but may rather be reduced.

Figure 6:
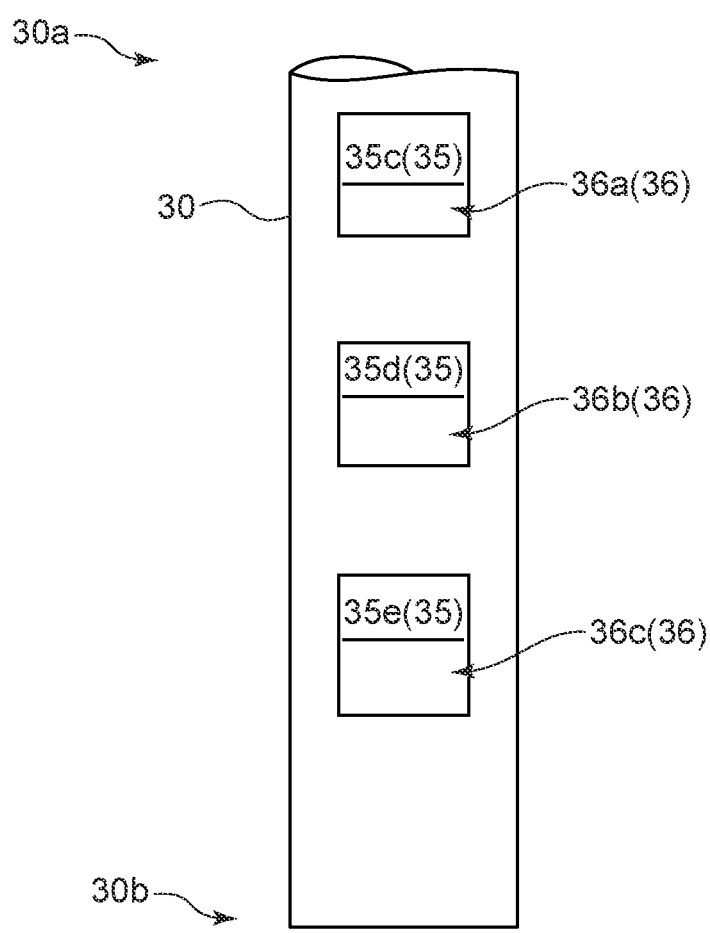
FIG. 6 is a view as seen from the direction of an arrow VI in FIG. 3.
Figure 7:
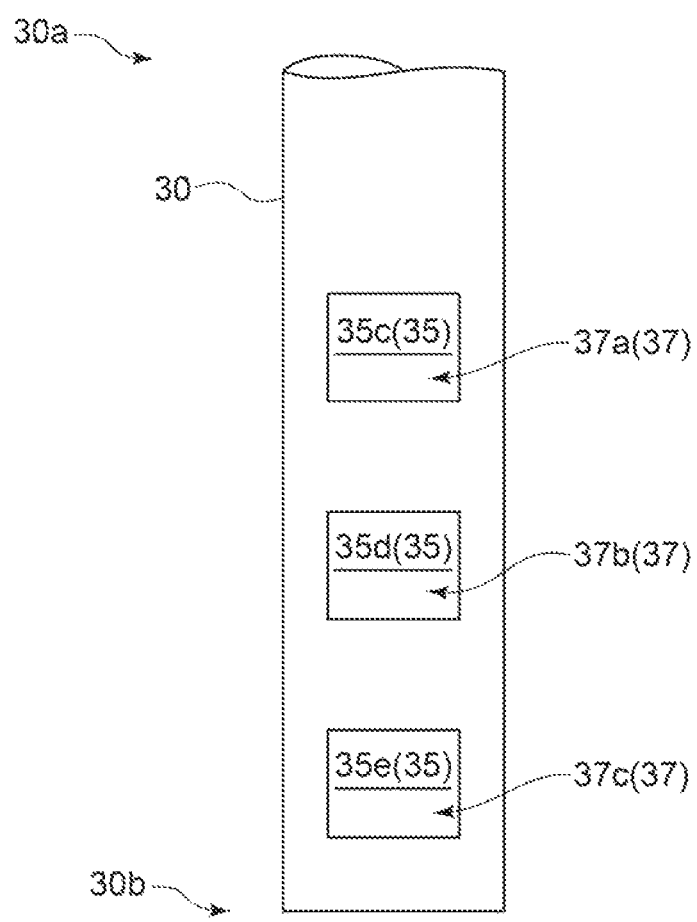
FIG. 7 is a view as seen from the direction of an arrow VII in FIG. 3.

As shown in FIG. 6, the internal passage 35 includes three divided internal passages 35c, 35d, 35e that do not communicate with each other in the axial direction. The divided internal passages 35c, 35d, 35e respectively include first divided openings 36a, 36b, 36c that constitute the first opening 36. In this case, as shown in FIG. 7, the divided internal passages 35c, 35d, 35e respectively include second divided openings 37a, 37b, 37c that constitute the second opening 37. The number of divisions of the internal passage 35 is not limited to three, but the internal passage 35 may be divided into two, or may be divided into any number of at least four. In that case, the number of divisions of each of the first opening 36 and the second opening 37 is the same as the number of divisions of the internal passage 35.

As described above, it is preferable to determine such that each of the third openings 38a to 38f (see FIG. 5) is located within the range where the second opening 37 (see FIG. 4) exists in the axial direction. If the first opening 37 and the second opening 37 each thus include the plurality of divided openings, as shown in FIG. 3, the configuration is preferable in which the third opening 38f is located within a range where the second divided opening 37a exists in the axial direction, the third opening 38d is located within the range where the second divided opening 37b exists in the axial direction, and the third opening 38b is located within a range where the second divided opening 37c exists in the axial direction. Although not illustrated in FIG. 3, the configuration is preferable in which the third openings 38a, 38c, 38e (see FIG. 5) are also located within ranges where the second divided openings 37c, 37b, 37a exist in the axial direction, respectively.

Contrasting FIG. 6 with FIG. 7, although the first opening 36 and the second opening 37 have the same opening width in the circumferential direction, the opening width in the axial direction is smaller in the latter than in the former. Accordingly, an opening area of the second opening 37 is smaller than an opening area of the first opening 36. Thus, it can be configured such that the internal passage 35, that is, each of the divided internal passages 35c, 35d, 35e, has the passage area decreasing from the first opening 36 toward the second opening 37, or from a position between the first opening 36 and the second opening 37 toward the second opening 37.

With respect to such configuration regarding the opening areas of the first opening 36 and the second opening 37, it is preferable to satisfy $(w_{1a}/w_{2a})>(w_{1p}/w_{2p})$, where $w_{1a}$ and $w_{1p}$ are respectively an opening width of the first opening 36 in the axial direction and an opening width of the first opening 36 in the circumferential direction, and $w_{2a}$ and $w_{2p}$ are respectively an opening width of the second opening 37 in the axial direction and an opening width of the second opening 37 in the circumferential direction.

Figure 8:
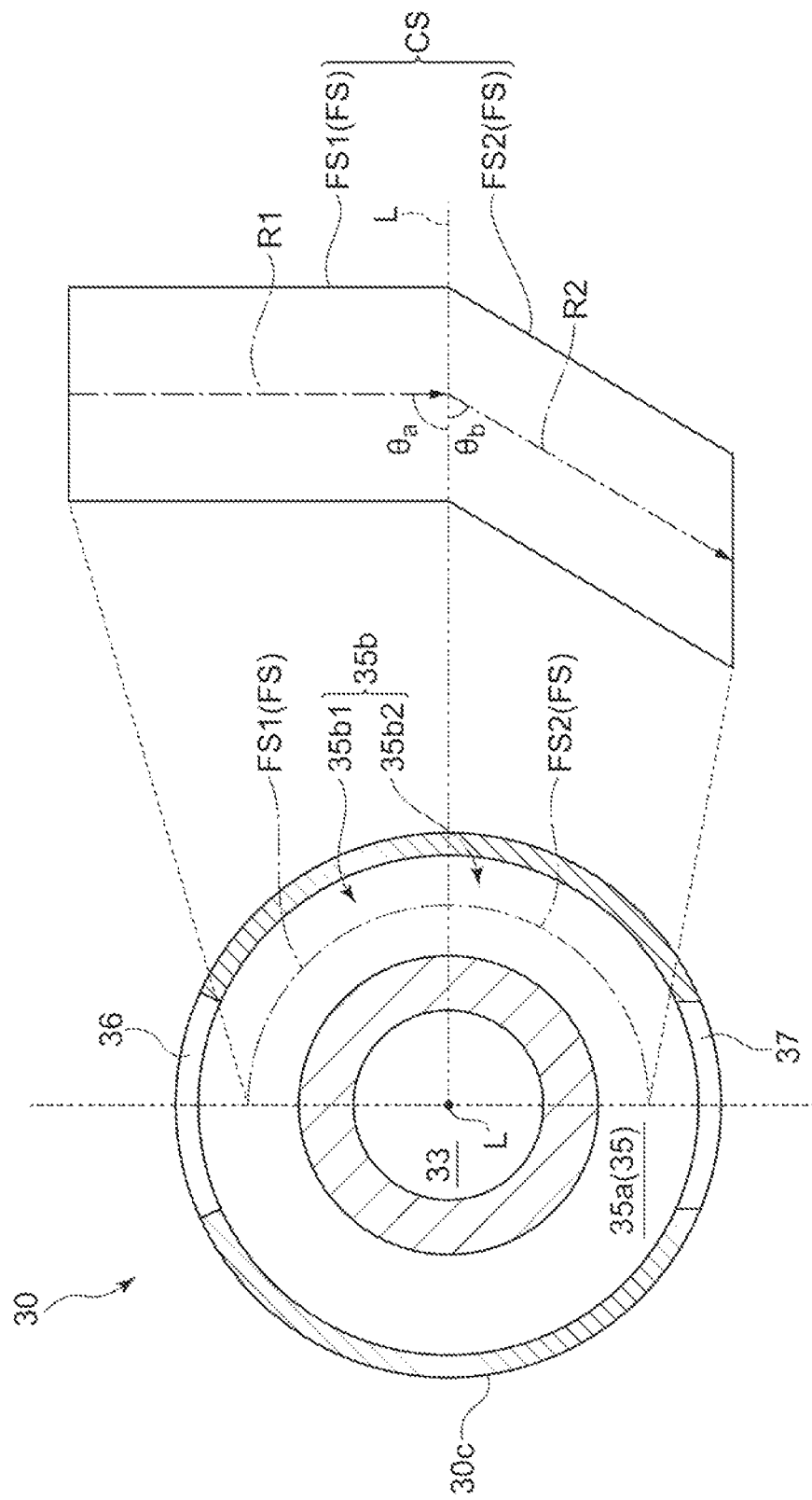
FIG. 8 is a view where any passage surface of one branch passage portion of an internal passage and an axis of a body are developed on a virtual plane with respect to the cross-sectional view shown in FIG. 4.

An example of a configuration for achieving the configuration where the passage area of the internal passage 35 decreases from the position between the first opening 36 and the second opening 37 toward the second opening 37 will be described with reference to FIG. 8. FIG. 8 is a view where a cut surface CS along the axis L of any passage surface FS of the one branch passage portion 35b of the internal passage 35 and the axis L of the body 30 are developed on a virtual plane with respect to the cross-sectional view (the left-side view of FIG. 8) shown in FIG. 4, (the right-hand view of FIG. 8 and hereinafter, this view will be referred to as the "development view" and the form represented in the development view will be referred to as the "development form").

The branch passage portion 35b is divided into a first passage portion 35b1 which is an upstream portion and a second passage portion 35b2 which is a downstream portion from the first opening 36 toward the second opening 37, and of the passage surface FS, FS1 is a passage surface corresponding to the first passage portion 35b1 and FS2 is a passage surface corresponding to the second passage portion 35b2. In the above-described development view, θa is an angle formed by a direction R1 in which the passage surface FS1 of the first passage portion 35b1 extends with respect to the axis L, and Ob is an angle formed by a direction R2 in which the passage surface FS2 of the second passage portion 35b2 extends with respect to the axis L. The simplest configuration of the branch passage portion 35b satisfies 0°<θa=θb<90°, and the configuration corresponds to the configuration shown in FIG. 3. That is, in this configuration, the branch passage portion 35b extends from the first opening 36 to the second opening 37 while forming a constant angle with respect to the axis L.

FIG. 8 shows an example of not such a simplest configuration but a configuration of θb<θa. That is, FIG. 8 shows the example of the configuration where the second passage portion 35b2 is bent toward the tip end portion 30b (see FIG. 3) with respect to the first passage portion 35b1 (in FIG. 8, in the depth direction perpendicular to the drawing). With such configuration (both of the configuration of 0°<θa=θb<90° and the configuration of θb<θa), it is possible to achieve the configuration where the passage area of the internal passage 35 decreases, that is, the passage area of the second passage portion 35b2 decreases from the position between the first opening 36 and the second opening 37 toward the second opening 37. Further, with the configuration where the second passage portion 35b2 is bent toward the tip end portion 30b with respect to the first passage portion 35b1, it is also possible to dispose the second opening 37 at the same position as the third opening 38, through which fuel is injected, in the axial direction.

Although FIG. 8 depicts so as to satisfy θa=90°, the present disclosure is not limited this form. Even with any angle of θa=90°, as long as θb<θa is satisfied, it is possible to achieve the configuration where the passage area of the internal passage 35 decreases from the position between the first opening 36 and the second opening 37 toward the second opening 37.

FIG. 6 is depicted such that the respective opening areas of the first divided openings 36a to 36c are the same, but the present disclosure is not limited to this form. At least two of the respective opening areas of the first divided openings 36a to 36c may be different from each other. For example, if there are neither the radial passages 34c nor 34e, and thus if there are neither the third openings 38c nor 38e for the configuration shown in FIG. 5, of the first opening 36, the opening area of the first divided opening 36c of the divided internal passage 35e located closest to the tip end portion 30b may be larger than the respective opening areas of the first divided openings 36a, 36b of the other divided internal passages 35c, 35d. In this case, the third openings 38f and 38d (see FIG. 5) exist within the ranges where the second divided openings 37a, 37b (see FIG. 7) of the divided internal passages 35c, 35d exist in the axial direction, respectively. However, the two third openings 38a, 38b (see FIG. 5) exist within the range where the second divided opening 37c (see FIG. 7) of the divided internal passage 35e exists in the axial direction. That is, the opening area of the third opening 38 existing within the range where the second divided opening 37c exists in the axial direction is larger than the opening area of the third opening 38 existing within the other two ranges.

As will be described later, fuel is injected from the third opening 38 after flowing through the axial passage 33 (see FIGS. 4 and 5), and the part of the air compressed by the compressor 2 (see FIG. 1) flows out of the internal passage 35 via the second divided openings 37a, 37b, 37c (see FIG. 7) after flowing into the divided internal passages 35c, 35d, 35e via the first divided openings 36a, 36b, 36c, respectively. It is considered that the amount of the injected fuel is larger in the range where the second divided opening 37c exists in the axial direction than in the ranges where the second divided openings 37a, 37b exist in the axial direction. By contrast, by adopting the above-described configuration for the opening area of each of the first divided openings 36a, 36b, 36c, the amount of air flowing into the divided internal passage 35e corresponding to the latter range is larger than that into the other divided internal passage 35c, 35d.

It is preferable to satisfy $(S_{1L}/S_{2L})>(S_{1S}/S_{2S})$, where, with respect to such configuration regarding the opening areas of the first opening 36 and the second opening 37, $S_{2L}$ is an opening area of the second divided opening 37c defining the range where the third opening 38 is located which has the largest opening area among the third openings 38a to 38f within the ranges where the second divided openings 37a to 37c respectively exist in the axial direction, that is, the ranges where the third openings 38a, 38b are located, $S_{1L}$ is an opening area of the first divided opening 36c corresponding to the second divided opening 37c, $S_{2S}$ is an opening area of the second divided opening 37a, 37b defining each range where each of the other third openings 38c, 38d, 38e, 38f is located, and Sis is an opening area of the first divided opening 36a, 36b corresponding to the second divided opening 37a, 37b.

As shown in FIG. 7, it is configured such that the opening areas of the second divided openings 37a, 37b, 37c are all the same. As will be described later, the part of the air compressed by the compressor 2 (see FIG. 1) flows out of the internal passage 35 via the second opening 37 after flowing into the internal passage 35 via the first opening 36, and the amount of the air flowing out of the second divided opening 37a, 37b, 37c can be adjusted by the opening area of the first divided opening 36a, 36b, 36c corresponding to the second divided opening 37a, 37b, 37c, making it possible to simplify design work of the peg 28.

Even though the opening areas of the second divided openings 37a, 37b, 37c are all the same, it does not require that the respective opening areas are completely the same. It is only necessary that the opening areas are substantially the same, even though there is a slight difference. As the extent thereof, for example, it is only necessary that the ratio of the opening area of the second divided opening 37a, 37b, 37c to an average value of the opening areas of the second divided openings 37a, 37b, 37c is 0.8 to 1.2.

<Operation of Gas Turbine, Combustor, and Combustion Injector According to Embodiment of Present Disclosure>

As shown in FIG. 1, during the operation of the gas turbine 1, air compressed by compressor 2 is produced, and the air is introduced into combustor 3. In the combustor 3, the compressed air is mixed with fuel, and then the air-fuel mixture is combusted to generate a high-temperature and high-pressure combustion gas. The combustion gas is introduced into the turbine 4 to drive the turbine 4, and a rotational driving force generated by the turbine 4 is output to the compressor 2 and an external device (for example, the generator 6 or the like).

As shown in FIG. 2, the air introduced into the combustor 3 flows into the combustion liner 12 through the passage 21 and is mixed with the fuel supplied from the pilot nozzle 23 and the main nozzle 26 to be the air-fuel mixture, and the air-fuel mixture is combusted to generate the combustion gas. The air passes through the pegs 28 when passing through the passage 21. At this time as well, fuel is supplied from the peg 28, and the air and the fuel are mixed.

Figure 9:
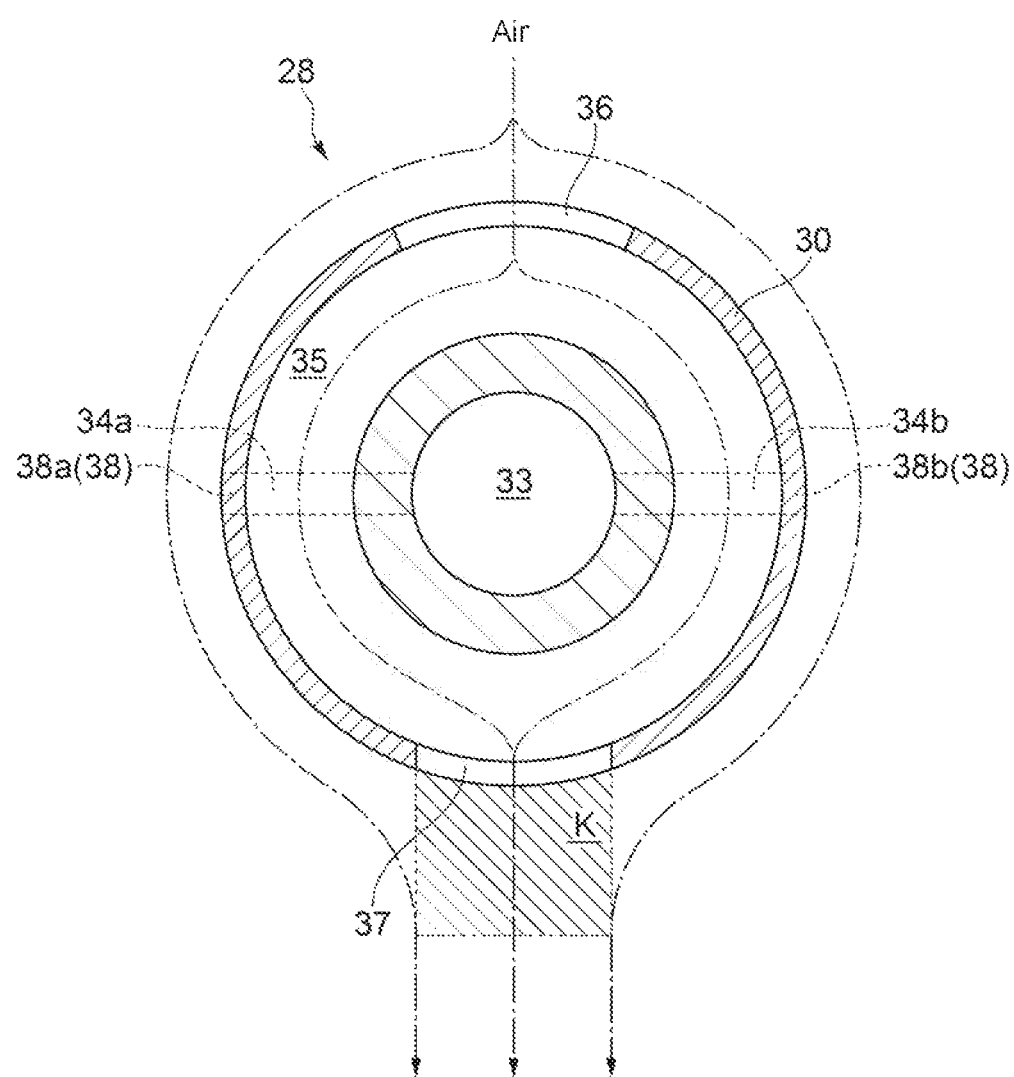
FIG. 9 is a conceptual view for describing air and fuel flow around the combustion injector according to an embodiment of the present disclosure.

As shown in FIG. 5, the fuel supplied to the peg 28 from a supply source (not shown) is distributed to the radial passages 34a to 34f while flowing through the axial passage 33 from the base end portion 30a side toward the tip end portion 30b side, and is injected to the passage 21 from the third openings 38a to 38f. Meanwhile, as shown in FIG. 9, when passing through the peg 28, the air flowing through the passage 21 branches to both sides of the peg 28 and passes through the peg 28. At this time, for example, the fuel injected from the third openings 38a, 38b branches to the both sides of the peg 28 to be mixed with the branched airs passing through the peg 28, and the branched airs and fuels merge downstream of the peg 28 in the air flow direction. In a region between the peg 28 and a position where the airs and fuels, which branch to the both sides of the peg 28 and pass through the peg 28, merge downstream of the peg 28, that is, a region K on a back side of the peg 28 as seen in the air flow direction, stagnation of air and fuel, that is, stagnation of air and fuel flow may be formed. The stagnation of air and fuel in the region K causes a decrease in reliability of the combustor 3 (see FIG. 2).

However, in the case where the peg 28 is used, if the peg 28 is disposed so as to face a direction in which air flows through the first opening 36, when air passes through the peg 28, a part of the air flows through the internal passage 35 via the first opening 36 and flows out of the internal passage 35 via the second opening 37. According to the positional relationship between the first opening 36 and the second opening 37 in the peg 28, since the second opening 37 faces the region K, the air flowing out of the internal passage 35 via the second opening 37 flows out towards the region K. Then, even if the state is entered where air and fuel stagnate in the region K, since the air flowing out of the internal passage 35 toward the region K sweeps away the air and the fuel that would stagnate in the region K toward downstream, it is possible to reduce the possibility that the stagnation of air and fuel flow is formed in the region K.

As shown in FIGS. 6 and 7, in the peg 28, since the opening area of the second opening 37 is smaller than the opening area of the first opening 36, the flow velocity of air flowing out of the second opening 37 is greater than the flow velocity of air flowing into the first opening 36. Thus, compared to the case where the opening area of the second opening 37 and the opening area of the first opening 36 are the same, the ability to sweep away the air and the fuel stagnating in the region K is increased, making it possible to further reduce the possibility that the stagnation of air and fuel flow is formed. Further, as shown in FIG. 8, with the configuration where the passage area of the inner second passage portion 35b2 decreases toward the second opening 37, the flow velocity of air flowing through the second passage portion 35b2 gradually increases, making it possible to suppress unnecessary turbulence in flow of the air flowing out of the second opening 37.

With the configuration where, in the peg 28, the opening area of the first divided opening 36c of the divided internal passage 35e located closest to the tip end portion 30b is larger than the opening area of the first divided opening 36a, 36b of the other divided internal passage 35c, 35d, the third opening 38f is located within the range where the second divided opening 37a exists in the axial direction, the third opening 38d is located within the range where the second divided opening 37b exists in the axial direction, and the third opening 38a, 38b is located within the range where the second divided opening 37c exists in the axial direction, the amount of the air flowing into the divided internal passage 35e increases as compared with the amount of the air flowing into the divided internal passage 35c, 35d. As shown in FIG. 9, in the peg 28, the air flowing out of the second opening 37 suppresses that the air-fuel mixture of the fuel and the air flowing out of the third opening 38 stagnates in the region K, the air flowing out of the second opening 37 suppresses that the air-fuel mixture of the fuel and the air flowing out of the third opening 38 stagnates in the region K, and the air flowing out of the second opening 37 suppresses that the air-fuel mixture of the fuel and the air flowing out of the third opening 38 stagnates in the region K. In the configuration where the third opening 38 includes the four third openings 38a, 38b, 38d, 38f as described above, since the total amount of the fuel flowing out of the third openings 38a and b is larger than the amount of the fuel flowing out of each of the third openings 38c and d, if fuel and air stagnate in the region K, the concentration of the fuel in the stagnant air-fuel mixture increases, which greatly affects the reliability of the combustor 3 (see FIG. 2). However, since the amount of air flowing into the divided internal passage 35e is larger than the amount of air flowing into the other divided internal passage 35c, 35d, the ability to sweep away the air and the fuel stagnating in the region K also increases. As a result, the air and the fuel stagnating in the region K are swept away, and it possible to reduce the possibility that the stagnation of air and fuel flow is formed.

As already described, in the peg 28, the third opening 38 is located within the range where the second opening 37 exists in the axial direction of the body 30. With such configuration, since the air flowing out of the internal passage 35 (see FIG. 4) via the second opening 37 passes through the region K at the position where the third opening 38 exists in the axial direction, the air and the fuel stagnating in the region K are swept away, and it possible to reduce the possibility that the stagnation of air and fuel flow is formed.

In the peg 28, the internal passage 35 includes the two branch passage portions 35a, 35b, but the configuration may be adopted where the internal passage 35 includes only one of the branch passage portions 35a, 35b.

<Modified Example of Combustion Injector According to Embodiment of Present Disclosure>

In FIG. 9, inner wall surfaces 35c1 and 35c2 defining the divided internal passage 35c, inner wall surfaces 35d1 and 35d2 defining the divided internal passage 35d, and inner wall surfaces 35e1 and 35e2 defining the divided internal passage 35e are each drawn as a flat surface. However, the inner wall surface is not limited to the flat surface, but may be a smoothly curved surface, or a surface provided with a step, unevenness, or the like.

Figure 10:
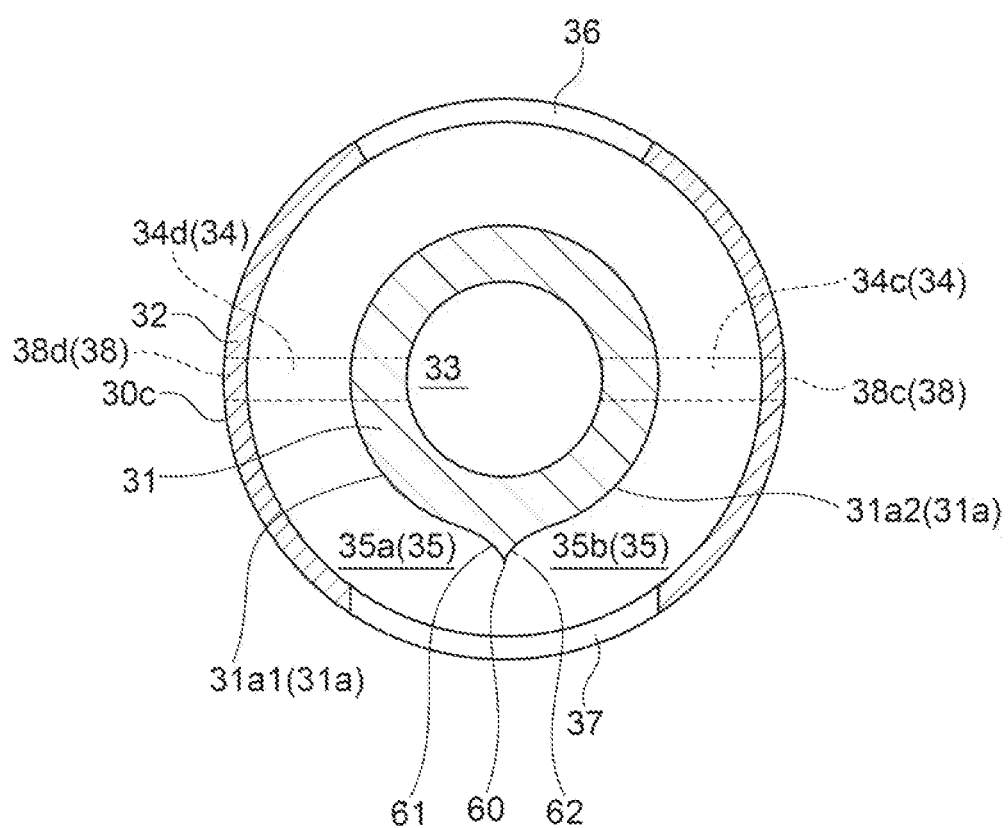
FIG. 10 is a cross-sectional view showing a modified example of the combustion injector according to an embodiment of the present disclosure.

As shown in FIG. 10, the inner pipe 31 may include a projection 60 projecting from the outer surface 31a of the inner pipe 31 toward the second opening 37 in a range where the second opening 37 is open. The projection 60 preferably has a configuration with a cross-sectional shape sharpened toward the second opening 37, by a surface portion 61 where the outer surface 31a1 of the outer surface 31a defining the branch passage portion 35a reverses a curved direction on the way to the projection 60 and a surface portion 62 where the outer surface 31a2 of the outer surface 31a defining the branch passage portion 35b reverses a curved direction on the way to the projection 60. With such configuration, air flowing in the vicinities of the outer surfaces 31a1, 31a2 is directed toward the second opening 37 along the surface portions 61, 62 respectively, making it possible to suppress turbulence in flow that may occur due to collision when airs flowing through the branch passage portions 35a, 35b merge. Thus, it is possible to suppress turbulence in flow that may be included in the air flowing out of the second opening 37.

Figure 11:
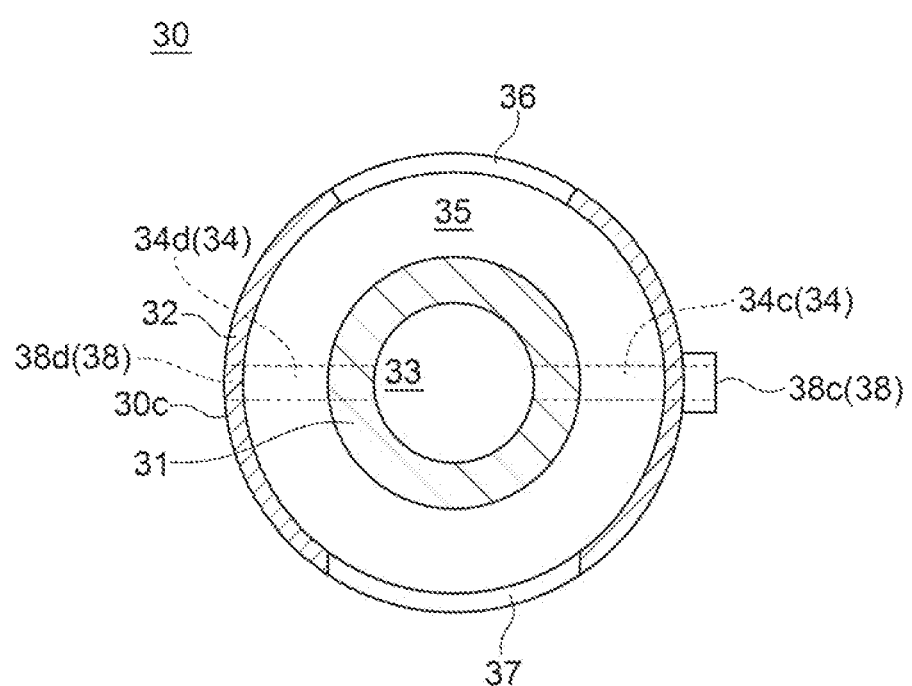
FIG. 11 is a cross-sectional view showing another modified example of the combustion injector according to an embodiment of the present disclosure.

As shown in FIG. 11, the third opening 38 may project from the outer surface 30c of the body 30. Although FIG. 11 depicts such that only the third opening 38c projects from the outer surface 30c, the other third openings 38a, 38b, 38d, 38e, 38f may have the same configuration. Further, some of the plurality of third openings 38 may have such configuration.

The fuel injector of the present disclosure is not limited to the configuration of the peg 28. Any configuration may be adopted as long as the air flowing out of the internal passage in the peg can sweep away the air and the fuel stagnating in the region K, and the configuration of the combustion injector according to another embodiment is illustrated in FIG. 12.

Figure 12:
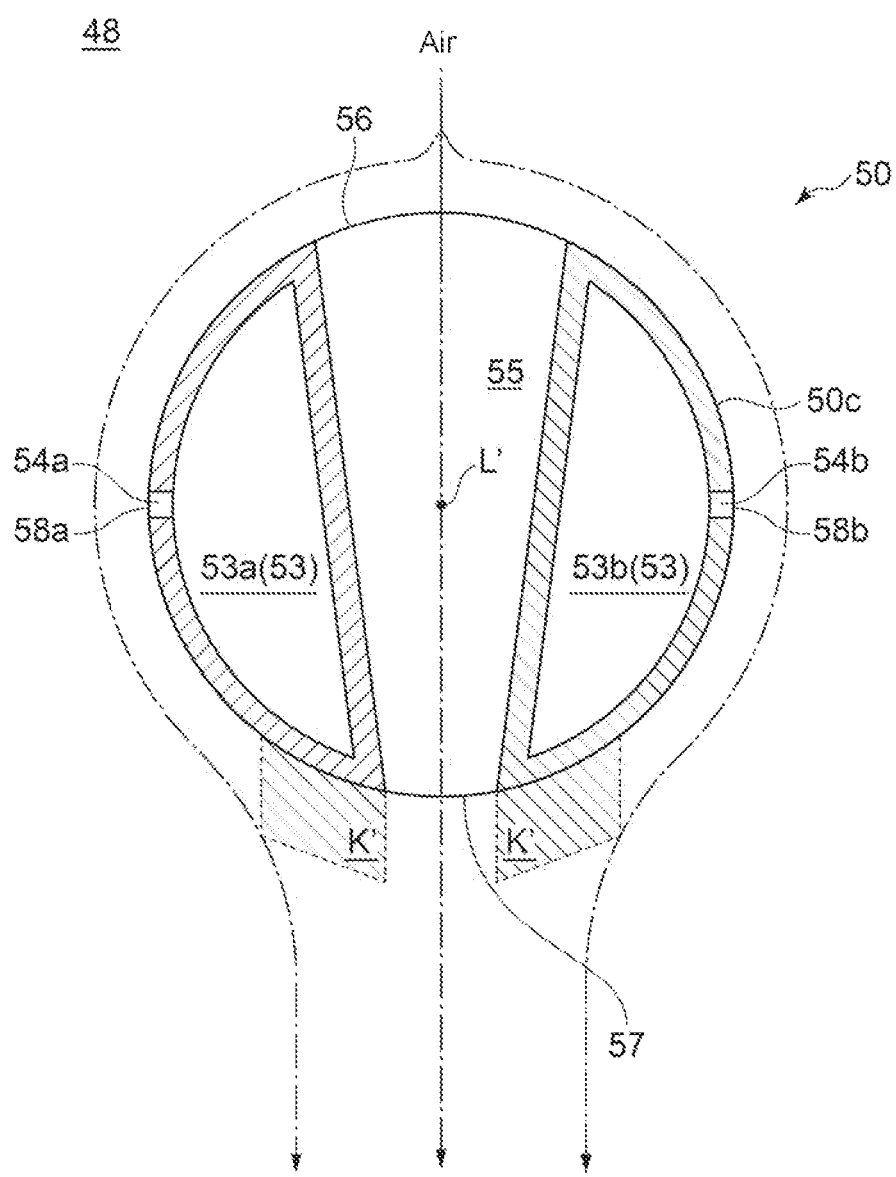
FIG. 12 is a cross-sectional view showing still another modified example of the combustion injector according to an embodiment of the present disclosure.

In a peg 48 illustrated in FIG. 12, an axial passage 53 formed in a body 50 has a structure where the axial passage 53 is partially divided into two divided axial passages 53a, 53b in the axial direction of the body 50 (the direction perpendicular to the drawing in FIG. 12). The axial passage 53 may have at least two structures each in which the axial passage 53 is divided into the two divided axial passages 53a, 53b, at different positions in the axial direction of the body 50. Further, the body 50 is formed with radial passages 54a, 54b each of which communicates at one end with the divided axial passage 53a, 53b and opens at another end to an outer surface 50c of the body 50. The body 50 may be formed with only one of the radial passages 54a, 54b. Furthermore, the body 50 is formed with an internal passage 55 formed so as to pass between the divided axial passages 53a and 53b. Openings where both ends of the internal passage 55 open to the outer surface 50c of the body 50 are a first opening 56 and a second opening 57, respectively, and openings where the radial passages 54a, 54b open to the outer surface 50c of the body 50 are third openings 58a, 58b, respectively. By configuring such that the axial passage 53 has the at least two structures, each in which the axial passage 53 is divided into the two divided axial passages 53a, 53b, at the different positions in the axial direction, the body 50 can be formed with at least two internal passages 55 at the different positions in the axial direction.

In the peg 48, a part of air flowing toward the peg 48 flows into the internal passage 55 via the first opening 56, and the rest of the air branches to both sides of the peg 48 and passes through the peg 48. At this time, fuel injected from the third openings 58a, 58b branches to the both sides of the peg 48 to be mixed with the branched airs passing through the peg 48, and the branched air and fuels merge downstream of the peg 48 in the air flow direction. In the peg 48 as well, the air flowing out of the internal passage 55 via the second opening 57 flows out toward a region on a back side of the peg 48 as seen in the air flow direction. Thus, even if fuel and air would stagnate in the region on the back side of the peg 48, they are swept away by the air flowing out of the second opening 57.

However, in the peg 48, unlike the peg 28 (see FIG. 4), by making an opening width of the second opening 57 in the circumferential direction centered on an axis L' of the body 50 smaller than an opening width of the first opening 56, an opening area of the second opening 57 is smaller than an opening area of the first opening 56. Then, a regions K' corresponding to the region K in FIG. 9 may be formed on both sides of the second opening 57 in the circumferential direction centered on the axis L' of the body 50. Thus, in the peg 28, as compared to the peg 48, it is possible to further reduce the possibility that the stagnation is formed in the region K.

In the combustor 3 and the gas turbine 1, by using the peg 28 or 48 as the fuel injection device which constitutes a top hat nozzle disposed on the passage 21 in the combustor 3, it is possible to reduce the possibility that the stagnation of air and fuel flow is formed. Thus, it is possible to prevent the configuration of the combustor 3 and the gas turbine 1 from becoming complicated.

In each of the above-described embodiments, the cross-sectional shape of the outer shape of the body 30, 50 is circular. However, the cross-sectional shape is not limited to this shape, but may be any cross-sectional shape such as an oval shape, a polygonal shape, or an airfoil shape. In this case, a line extending in the axial direction of the body 30, 50 through the center of gravity of any cross-sectional shape can be the axis L, L' of the body 30, 50.

The contents described in the above embodiments would be understood as follows, for instance.

[1] A fuel injector according to one aspect is a fuel injector (peg 28, 48) that has a body (30, 50) extending in an axial direction. The body (30, 50) includes: an axial passage (33, 53) formed so as to extend in the axial direction; a radial passage (34, 54a, 54b) formed so as to communicate at one end with the axial passage (33, 53) and to open at another end to an outer surface (30c, 50c) of the body (30, 50); and an internal passage (35, 55) including a first opening (36, 56) and a second opening (37, 57) open to the outer surface (30c, 50c), and formed so as to extend inside the body (30, 50) from the first opening (36, 56) to the second opening (37, 57). The first opening (36, 56) and the second opening (37, 57) are located opposite to each other across a third opening (38, 58, 58b), through which the radial passage (34, 54a, 54b) opens to the outer surface (30c, 50c), in a circumferential direction centered on an axis (L) of the body (30, 50).

According to the fuel injector of the present disclosure, it is possible to reduce the possibility that stagnation of air and fuel flow is formed in a downstream region of the fuel injector, making it possible to improve reliability of the combustor.

[2] A fuel injector according to another aspect is the fuel injector as defined in [1], where an opening area of the second opening (37, 57) is smaller than an opening area of the first opening (36, 56).

With such configuration, since the flow velocity of air flowing out of the second opening is greater than the flow velocity of air flowing into the first opening, the ability to sweep away the air and the fuel stagnating in the downstream region of the fuel injector is increased, making it possible to further reduce the possibility that the stagnation is formed and to improve reliability of the combustor.

[3] A fuel injector according to still another aspect is the fuel injector as defined in [1] or [2], where an opening width of the second opening (37, 57) in the axial direction is smaller than an opening width of the first opening (36, 56) in the axial direction.

With such configuration, since the configuration is possible where the opening width of the second opening in the circumferential direction is not smaller than the opening width of the first opening in the circumferential direction, it is possible to reduce the possibility that the stagnation of air and fuel flow may be formed on both sides of the second opening in the circumferential direction. Thus, it is possible to improve reliability of the combustor.

[4] A fuel injector according to yet another aspect is the fuel injector as defined in any one of [1] to [3], where the body (30) has a tip end portion (30b) and a base end portion (30a), the internal passage (35) includes a plurality of divided internal passages (35c, 35d, 35e) that do not communicate with each other in the axial direction, the plurality of divided internal passages (35c, 35d, 35e) each include a first divided opening (36a, 36b, 36c) that constitutes the first opening (36), and an opening area of the first divided opening (36c) of a divided internal passage (35e) located closest to the tip end portion (30b) among the plurality of divided internal passages (35c, 35d, 35e) is larger than an opening area of the first divided opening (36a, 36b) of another divided internal passage (35c, 35d).

In the body where a plurality of third openings are open at different positions in the axial direction, if the number of third openings in the vicinity of the tip end portion is greater than the number of third openings at other positions, a fuel injection amount in the vicinity of the tip end portion is greater than a fuel injection amount at the other positions. By contrast, with the above configuration [4], the amount of air flowing into the divided internal passage located closest to the tip end portion among the plurality of divided internal passages is greater than the amount of air flowing into the another divided internal passage, and the amount of the air flowing out of the divided internal passage located closest to the tip end portion is greater than the amount of the air flowing out of the another divided internal passage. Thus, the air and the fuel stagnating in the downstream region of the fuel injector in the vicinity of the tip end portion are swept away, and it is possible to reduce the possibility that the stagnation of air and fuel flow is formed.

[5] A fuel injector according to yet another aspect is the fuel injector as defined in any one of [1] to [4], where the body (30) has a tip end portion (30b) and a base end portion (30a), the internal passage (35) includes a plurality of divided internal passages (35c, 35d, 35e) that do not communicate with each other in the axial direction, the plurality of divided internal passages (35c, 35d, 35e) respectively include second divided openings (37a, 37b, 37c) that constitute the second opening (37), and a ratio of each opening area of a plurality of the second divided openings (37a, 37b, 37c) to an average value of opening areas of the plurality of second divided openings (37a, 37b, 37c) is 0.85 to 1.2.

With such configuration, the opening areas of the respective second divided openings are substantially the same. Then, the amount of the air flowing out of each second divided opening can be adjusted by the opening area of each first divided opening corresponding to each second divided opening, making it possible to simplify design work of the fuel injector.

[6] A fuel injector according to yet another aspect is the fuel injector as defined in any one of [1] to [5], where the third opening (38) is located within a range where the second opening (37) exists in the axial direction.

If air and fuel stagnate in the downstream region of the fuel injector, the amount of stagnant air and fuel in the downstream region of the fuel injector at the position where the third opening exists in the axial direction increases. By contrast, with the above configuration [6], since the air flowing out of the internal passage via the second opening passes through the downstream region of the fuel injector at the position where the third opening exists in the axial direction, the air and the fuel stagnating in the downstream region of the fuel injector are swept away, and it possible to reduce the possibility that the stagnation of air and fuel flow is formed.

[7] A fuel injector according to yet another aspect is the fuel injector as defined in [6], where the internal passage (35) includes a plurality of divided internal passages (35c, 35d, 35e) that do not communicate with each other in the axial direction, and the plurality of divided internal passages (35c, 35d, 35e) each include a first divided opening (36a, 36b, 36c) that constitutes the first opening (36) and a second divided opening (37a, 37b, 37c) that constitutes the second opening (37), and $(S_{1L}/S_{2L})>(S_{1S}/S_{2S})$ is satisfied, where $S_{2L}$ is an opening area of the second divided opening (37c) defining the range where a third opening (38a, 38b) is located which has a largest opening area among the third opening (38a, 38b, 38c, 38d) within the range where each of a plurality of the second divided openings (37a, 37b, 37c) exists in the axial direction, $S_{1L}$ is an opening area of a first divided opening (36c) corresponding to the second divided opening (37c), $S_{2S}$ is an opening area of the second divided opening (37a, 37b) defining the range where another third opening (38c, 38d) is located, and $S_{1S}$ is an opening area of a first divided opening (36a, 36b) corresponding to the second divided opening (37a, 37b).

Since such configuration is a more preferable configuration of the above configuration [6], it is possible to obtain the technical effect of the above configuration [6].

[8] A fuel injector according to yet another aspect is the fuel injector as defined in any one of [1] to [7], where $(w_{1a}/w_{2a}) > (w_{1p}/w_{2p})$ is satisfied, where $w_{1a}$ and $w_{1p}$ are respectively an opening width of the first opening (36) in the axial direction and an opening width of the first opening (36) in the circumferential direction, and $w_{2a}$ and $w_{2p}$ are respectively an opening width of the second opening (37) in the axial direction and an opening width of the second opening (37) in the circumferential direction.

Since such configuration is a more preferable configuration of the above configurations [1] to [7], it is possible to obtain the technical effects of the above configurations [1] to [7].

[9] A fuel injector according to yet another aspect is the fuel injector as defined in any one of [1] to [8], where the internal passage (35) extends so as to surround the axial passage (33) on a radially inner side of the body (30).

With such configuration, the opening width of the second opening in the circumferential direction can be made as large as possible. If the opening width of the second opening in the circumferential direction is small, stagnation points are formed on the both sides of the second opening in the circumferential direction. By contrast, with the above configuration [9], it is possible to further reduce the possibility that the stagnation points are formed in the downstream region of the fuel injector.

[10] A fuel injector according to yet another aspect is the fuel injector as defined in [9], where the internal passage (35) includes: a first passage portion (35b1) extending from the first opening (36) toward the second opening (37) in the circumferential direction; and a second passage portion (35b2) extending from an end of the first passage portion (35b1) to the second opening (37) opposite to the first opening (36) in the circumferential direction, and in a development form where a cut surface (CS) along the axis (L) of the first passage portion (35b1) and the second passage portion (35b2) from the first opening (36) to the second opening (37) and the axis (L) are developed on a virtual plane, an angle (0b) formed by an extension direction (R2) of the second passage portion (35b2) with the axis (L) is smaller than an angle (0a) formed by an extension direction (R1) of the first passage portion (35b1) with the axis (L).

With such configuration, it is possible to form the fuel injector such that the opening area of the second opening is smaller than the opening area of the first opening. Further, with such configuration, it is also possible to dispose the second opening at the same position as the third opening, through which fuel is injected, in the axial direction.

[11] A fuel injector according to yet another aspect is the fuel injector as defined in any one of [1] to [10], where the internal passage (35) is configured such that a passage area decreases from the first opening (36) toward the second opening (37).

With such configuration, since the flow velocity of air flowing through the second passage portion increases toward the second opening, the ability to sweep away the air and the fuel stagnating in the downstream region of the fuel injector is increased, making it possible to further reduce the possibility that the stagnation of air and fuel flow is formed.

[12] A fuel injector according to yet another aspect is the fuel injector as defined in any one of [1] to [11], where the internal passage is configured such that an opening width on a passage cross section in the axial direction decreases from the first opening toward the second opening.

With such configuration, since it is possible to configure such that the passage area of the internal passage 35 decreases from the first opening 36 toward the second opening 37 without making the opening width of the second opening in the circumferential direction smaller than the opening width of the first opening in the circumferential direction, it is possible to increase the ability to sweep away the air and the fuel stagnating in the downstream region of the fuel injector and further reduce the possibility that the stagnation of air and fuel flow is formed, while reducing the risk that the stagnation is formed on the both sides of the second opening 57 in the circumferential direction.

[13] A fuel injector according to yet another aspect is the fuel injector as defined in any one of [1] to [12], where the internal passage (35) includes two branch passage portions (35a, 35b) extending from the first opening (36) toward the second opening (37) in opposite directions in the circumferential direction.

With such configuration, the opening width of the second opening in the circumferential direction can be made as large as possible. If the opening width of the second opening in the circumferential direction is small, the stagnation of air and fuel flow is formed on the both sides of the second opening in the circumferential direction. By contrast, with the above configuration [13], it is possible to further reduce the possibility that the stagnation is formed in the downstream region of the fuel injector.

[14] A combustor according to one aspect includes a fuel injector (28, 48) as defined in any one of [1] to [13].

According to the fuel injector of the present disclosure, by using the fuel injector as defined in any one of [1] to [13], it is possible to reduce the possibility that the stagnation of air and fuel flow is formed, making it possible to prevent the configuration of the combustor from becoming complicated.

[15] A gas turbine according to one aspect includes a compressor (2); the combustor (3) as defined in [14], and a turbine (4).

According to the fuel injector of the present disclosure, by using the combustor as defined in [14], it is possible to reduce the possibility that the stagnation of air and fuel flow is formed, making it possible to prevent the configuration of the gas turbine from becoming complicated.

REFERENCE SIGNS LIST

1 Gas turbine
2 Compressor
3 Combustor
4 Turbine
28 Peg (fuel injector)
30 Body
30a Base end portion (of body)
30b Tip end portion (of body)
30c Outer surface (of body)
33 Axial passage
34 Radial passage
34a Radial passage
34b Radial passage
34c Radial passage
34d Radial passage
35 Internal passage
35a Branch passage portion
35b Branch passage portion
35b1 First passage portion
35b2 Second passage portion 35c Divided internal passage
35d Divided internal passage
35e Divided internal passage
36 First opening
36a First divided opening
36b First divided opening
36c First divided opening
37 Second opening
37a Second divided opening
37b Second divided opening
37c Second divided opening
38 Third opening
38a Third opening
38b Third opening
38c Third opening
38d Third opening
48 Peg (fuel injector)
50 Body
50c Outer surface (of body)
53 Axial passage
54 Radial passage
54a Radial passage
54b Radial passage
55 Internal passage
56 First opening
57 Second opening
58a Third opening
58b Third opening
CS Cut surface
L Axis (of body)
L' Axis (of body)

The invention claimed is:

1. A combustor comprising:
a fuel injector that has a body extending in an axial direction;
an outer shell; and
a combustion liner disposed inside the outer shell with a predetermined spacing in a radial direction and centered on an axis of the outer shell,
wherein the body includes:
an axial passage formed so as to extend in the axial direction;
at least one radial passage formed so as to communicate at one end with the axial passage and to open at another end to an outer surface of the body; and
an internal passage including a first opening and a second opening open to the outer surface, and formed so as to extend inside the body from the first opening to the second opening,
wherein the at least one radial passage and the internal passage do not communicate with each other in the body,
wherein the internal passage is configured to extend so as to surround the axial passage in a circumferential direction centered on an axis of the body,
wherein the first opening and the second opening are located opposite to each other across a third opening, through which the at least one radial passage opens to the outer surface, in the circumferential direction centered on the axis of the body,
wherein air flows into the internal passage via the first opening, and the air flows out of the internal passage via the second opening,
wherein the body has a tip end portion and a base end portion,
wherein the internal passage includes a plurality of divided internal passages that do not communicate with each other in the axial direction,
wherein the plurality of divided internal passages each include a first divided opening that constitutes the first opening, and
wherein an opening area of the first divided opening of a divided internal passage located closest to the tip end portion among the plurality of divided internal passages is larger than an opening area of the first divided opening of another divided internal passage.

2. The combustor according to claim 1,
wherein an opening width of the second opening in the axial direction is smaller than an opening width of the first opening in the axial direction.

3. The combustor according to claim 1,
wherein the plurality of divided internal passages each include a second divided opening that constitutes the second opening, and
wherein a ratio of each opening area of the plurality of second divided openings to an average value of opening areas of the plurality of second divided openings is 0.8 to 1.2.

4. The combustor according to claim 1,
wherein the third opening is located within a range where the second opening exists in the axial direction.

5. The combustor according to claim 1,
wherein the plurality of divided internal passages each include a second divided opening that constitutes the second opening,
wherein the at least one radial passage includes a plurality of radial passages provided in different positions in the axial direction, the plurality of radial passages each including a third divided opening that constitutes the third opening,
wherein each of the third divided openings is located within ranges where each second divided opening exists in the axial direction, and
wherein $(S_{1L}/S_{2L}) > (S_{1S}/S_{2S})$ is satisfied, where $S_{2L}$ is an opening area of a first second divided opening of the second divided openings defining a first range of the ranges where a first third divided opening of the third divided openings is located which has a largest opening area among the third divided openings within the ranges of the second divided openings, $S_{1L}$ is an opening area of a first first divided opening of the first divided openings corresponding to the first second divided opening, $S_{2S}$ is an opening area of a second second divided opening of the second divided openings defining a second range of the ranges where a second third divided opening of the third divided openings is located, and $S_{1S}$ is an opening area of a second first divided opening of the first divided openings corresponding to the second second divided opening.

6. The combustor according to claim 1, wherein $(w_{1a}/w_{2a}) > (w_{1p}/w_{2p})$ is satisfied, where $w_{1a}$ and $w_{1p}$ are respectively an opening width of the first opening in the axial direction and an opening width of the first opening in the circumferential direction, and $w_{2a}$ and $w_{2p}$ are respectively an opening width of the second opening in the axial direction and an opening width of the second opening in the circumferential direction.

7. The combustor according to claim 1,
wherein the internal passage extends so as to surround the axial passage on a radially inner side of the body.

8. The combustor according to claim 1,
wherein the internal passage includes:

a first passage portion extending from the first opening toward the second opening in the circumferential direction; and a second passage portion extending from an end of the first passage portion to the second opening opposite to the first opening in the circumferential direction, and wherein, in a development form where a cut surface along the axis of the first passage portion and the second passage portion from the first opening to the second opening and the axis are developed on a virtual plane, an angle formed by an extension direction of the second passage portion with the axis is smaller than an angle formed by an extension direction of the first passage portion with the axis.

9. The combustor according to claim 1,
wherein the internal passage is configured such that a passage area decreases from the first opening toward the second opening.

10. The combustor according to claim 1,
wherein the internal passage is configured such that an opening width on a passage cross section in the axial direction decreases from the first opening toward the second opening.

11. The combustor according to claim 1,
wherein the internal passage includes two branch passage portions extending from the first opening toward the second opening in opposite directions in the circumferential direction.

12. A gas turbine, comprising:
a compressor; the combustor according to claim 1; and a turbine.

* * * * *